US012709463B1

(12) United States Patent
Sherman

(10) Patent No.: US 12,709,463 B1
(45) Date of Patent: Aug. 18, 2026

(54) CHEMICAL DISPENSING TANK AND SYSTEM FOR DISPENSING LIQUID CHEMICALS

(71) Applicant: Sherman Roto Tank LLC, Pearland, TX (US)

(72) Inventor: Wade Fischer Sherman, Houston, TX (US)

(73) Assignee: Sherman Roto Tank LLC, Pearland, TX (US)

( * ) Notice: Subject to any disclaimer, the term of this patent is extended or adjusted under 35 U.S.C. 154(b) by 0 days.

(21) Appl. No.: 19/205,508

(22) Filed: May 12, 2025

(51) Int. Cl.
*B65D 88/54* (2006.01)
*B65D 90/24* (2006.01)
*B67D 7/32* (2010.01)

(52) U.S. Cl.
CPC ........... *B65D 88/548* (2013.01); *B65D 90/24* (2013.01); *B67D 7/3209* (2013.01)

(58) Field of Classification Search
CPC ..... B65D 88/548; B65D 90/24; B67D 7/3209
See application file for complete search history.

(56) References Cited

U.S. PATENT DOCUMENTS 2,056,179 A * 10/1936 Fitch .................... B65D 88/128 294/68.1
2,189,945 A * 2/1940 Fitch ..................... B60P 3/2215 280/832
2,259,319 A * 10/1941 Norbom ................... B61D 5/06 280/832
3,263,865 A * 8/1966 Kachnik ............... B60P 3/2215 280/830
4,395,052 A * 7/1983 Rash ......................... B60P 3/24 280/832
4,610,409 A 9/1986 Emory, Jr.
4,641,680 A * 2/1987 Been ...................... B65D 90/24 4/321
4,862,909 A * 9/1989 Kim ........................ F04B 43/08 220/571
4,911,326 A * 3/1990 McGouran, Jr. ....... B65D 88/76 73/49.3
4,947,888 A * 8/1990 Tanner ..................... B67D 7/78 340/625

(Continued)

FOREIGN PATENT DOCUMENTS

EP 2678749 B1 4/2015

OTHER PUBLICATIONS

*100 Gallon Open Top Containment Basin*, www.gototanks.com (https://polytanksales.com/containment-tanks/200-gallon-spill-containment-tank.html) (publication date unknown—at least prior to May 12, 2025).

(Continued)

*Primary Examiner* — Frederick C Nicolas
(74) *Attorney, Agent, or Firm* — Keith B. Willhelm

(57) ABSTRACT

A tank system for storing and containing liquid chemicals has a poly tank and a containment basin. The poly tank is adapted for storing and discharging liquid chemicals. The containment basin has an open top and is adapted to receive liquid chemicals in the event of leakage from the tank. The tank is nested in the containment basin such that a lower portion of the tank lies within the basin and an upper portion of the tank covers the open top of the basin. The upper portion of the tank has an inlet and an outlet.

64 Claims, 8 Drawing Sheets

(56) References Cited

U.S. PATENT DOCUMENTS

| | | | | |
|---|---|---|---|---|
| 5,052,582 | A * | 10/1991 | Hall | B65D 90/24 220/571 |
| 5,053,206 | A | 10/1991 | Maglio et al. | |
| 5,071,166 | A * | 12/1991 | Marino | B65D 90/24 220/571 |
| 5,114,046 | A * | 5/1992 | Bryant | B60S 5/02 222/173 |
| 5,285,989 | A * | 2/1994 | Zilbert | B67D 3/0029 141/311 A |
| 5,305,926 | A * | 4/1994 | Webb | B67D 7/04 220/88.1 |
| 5,373,961 | A * | 12/1994 | Harris | B65D 81/261 220/675 |
| 5,400,924 | A * | 3/1995 | Brodie | B67D 7/32 222/173 |
| 5,480,191 | A * | 1/1996 | Litin | B65D 71/70 D34/24 |
| 5,555,999 | A * | 9/1996 | Wilcox | B65D 90/24 220/23.91 |
| 5,570,714 | A * | 11/1996 | Magish | B65D 90/44 137/213 |
| 5,692,647 | A * | 12/1997 | Brodie | B60S 5/02 222/173 |
| 5,752,543 | A * | 5/1998 | Groening | B62B 3/104 280/79.5 |
| 5,752,617 | A * | 5/1998 | Yung | B65D 90/24 220/4.12 |
| 5,813,680 | A * | 9/1998 | Shaw | B62B 1/264 414/490 |
| 5,881,760 | A * | 3/1999 | Del Zotto | B65D 88/76 220/571 |
| 5,884,709 | A * | 3/1999 | Evans | A62C 3/06 220/88.1 |
| 5,893,479 | A * | 4/1999 | Berberat | B65D 90/24 220/571 |
| 6,149,026 | A * | 11/2000 | Manson | B65D 90/24 220/571 |
| 6,189,720 | B1 * | 2/2001 | Gillispie | B67D 3/0029 141/311 A |
| 6,250,345 | B1 * | 6/2001 | Allwein | B67D 7/3209 141/311 A |
| 6,382,108 | B1 | 5/2002 | Stanek et al. | |
| 6,715,195 | B2 * | 4/2004 | Erickson | B29C 41/04 29/434 |
| 6,745,704 | B2 | 6/2004 | Carter et al. | |
| 7,234,608 | B2 * | 6/2007 | Reed | F16N 31/006 383/33 |
| 7,293,802 | B2 * | 11/2007 | Bachman | B60P 3/228 137/185 |
| 7,300,073 | B2 * | 11/2007 | Bachman | B60P 3/2205 137/590 |
| 7,621,422 | B2 | 11/2009 | Reed et al. | |
| 8,789,719 | B2 * | 7/2014 | Whelan | B60K 15/0406 220/378 |
| 10,293,982 | B2 * | 5/2019 | Woodruff | A47K 3/001 |
| 10,463,550 | B1 * | 11/2019 | Shekarchi | A45D 20/14 |
| 10,745,191 | B2 | 8/2020 | Cox | |
| 11,027,960 | B2 | 6/2021 | Kraenzie | |
| 11,279,554 | B2 | 3/2022 | Spann et al. | |
| 11,326,335 | B2 | 5/2022 | Casey et al. | |
| 11,691,808 | B2 | 7/2023 | Kotora | |
| 11,988,341 | B2 | 5/2024 | Gilmore et al. | |
| 12,355,389 | B2 * | 7/2025 | Myers | H02S 40/38 |
| 2006/0091667 | A1 * | 5/2006 | Bachman | B60P 3/2205 280/837 |
| 2008/0238077 | A1 * | 10/2008 | Bachman | B60P 3/224 280/837 |
| 2009/0242571 | A1 * | 10/2009 | Claborn | B65D 90/50 206/514 |
| 2010/0263736 | A1 | 10/2010 | Issartel | |
| 2015/0016209 | A1 * | 1/2015 | Barton | B01F 33/502 366/152.1 |
| 2015/0076164 | A1 | 3/2015 | De Cuyper et al. | |
| 2022/0349528 | A1 | 11/2022 | Byl et al. | |

OTHER PUBLICATIONS

*200 Gallon Ace Roto-Mold Spill Containment Tank*, www.polytanksales.com (https://polytanksales.com/containment-tanks/200-gallon-spill-containment-tank.html) (publication date unknown—at least prior to May 12, 2025).

Horizontal Tank—Closed Containment Basin (publication date unknown—at least prior to May 12, 2025).

Horizontal Tank—Open Containment Basin (publication date unknown—at least prior to May 12, 2025).

*Open Top Containment Packages*, Sherman Tank (www.sherman-tank.com) (https://www.sherman-tank.com/products/roto-molded-containments/) (publication date unknown—at least prior to May 12, 2025).

*Open Top Patriot Containment Packages*, Sherman Tank (www.sherman-tank.com) (https://www.sherman-tank.com/products/patriot-containments/) (publication date unknown—at least prior to May 12, 2025).

*Tank Containment*, www.usplastics.com (https://www.usplastic.com/catalog/default.aspx?catid=836) (publication date unknown—at least prior to May 12, 2025).

Vertical Tank—Open Containment Basis (publication date unknown—at least prior to May 12, 2025).

* cited by examiner

CHEMICAL DISPENSING TANK AND SYSTEM FOR DISPENSING LIQUID CHEMICALS

FIELD OF THE INVENTION

The present invention relates to systems for dispensing liquid chemicals as may be needed in industrial processes, and more particularly, to chemical dispensing tanks used in such systems, especially such systems as are used to inject liquid chemicals into wells and pipelines used to produce and transport hydrocarbon fluids such as oil and gas.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

Once the well has been drilled, it will be "completed" by installing a series of pipe sections or "joints" in the well bore to form a casing. The casing may be extended by installing additional pipe joints of somewhat smaller diameter to form a liner. (Both are referred to hereinafter as "casings" for the sake of convenience.) The casing is cemented in place by pumping cement through the casing and out into the annulus between the casing and well bore. In some wells the casing may incorporate a series of valves that can be opened. In other wells, perforations are formed in the casing by a "plug and perf" job.

In either event, openings in the casing are created through which hydrocarbons, that is oil and gas, can enter the cased well. Production tubing, valves, and other equipment are installed in the casing so that the hydrocarbons may flow in a controlled manner from the formation, into the casing, and through the production tubing up to the surface. Once at the surface, the hydrocarbons and other production fluids will be diverted through various types of surface equipment, such as sand separators and gas separators, and into fluid transportation systems, either for storage or downstream processing.

The casing and other downhole equipment in large part is made of steel, as is the surface equipment and pipelines used to transport oil and gas downstream from the well. While hydrocarbons in and of themselves have little or no deleterious effects on steel, the production fluids flowing into the well are infused with fluids other than hydrocarbons, such as water, and contaminants, such as dissolved acids and minerals. Hydrogen sulfide ($H_2S$), for example, may be present as a gas or dissolved in water present in production fluids. Either way, it can cause severe corrosion issues in the well, especially for high temperature wells, and throughout the downstream system. Minerals dissolved in water present in production fluids also can cause scaling. Hydrate formation can be a problem in high-temperature, high-pressure wells. Paraffin wax also can build up in pipelines transporting and processing liquid hydrocarbons.

Such issues and others can be addressed by treating production fluids with carefully selected and administered chemical agents. The chemical agents include corrosion inhibitors, scale inhibitors, hydrate inhibitors, hydrogen sulfide scavengers, emulsion breakers, dispersants, biocides, and chemicals mitigating other potential problems. The treatment chemicals typically are injected into the system as liquid solutions. Depending on the problem and the chemicals needed, the treatment may be a batch process in which is relatively large quantities of chemicals are flushed through the system. Other issues call for continuous treatment, during which relatively small amounts of chemicals are injected into the production stream at regular intervals over extended time periods.

Systems for injecting liquid chemicals into a well or an upstream transportation system typically include a tank in which the chemicals are stored. Chemicals, as needed, are fed through a line leading to a pump. The pump is used to deliver the liquid chemicals to an injection point, for example, a nozzle extending into the fluid stream that will be treated. The pumps typically are electrically powered and are controlled by an electronic controller incorporating, for example, a printed logic circuit.

Since they are often required in remote locations, chemical injection systems more often than not may have to operate off the power grid. Thus, they may be provided with solar panels and batteries to generate and store the electrical power required by the system. Because the chemicals themselves may pose an environmental risk, the chemical tank should be mounted over a containment basin. If there is a leakage or catastrophic failure of the tank, chemicals will flow into the basin where they can be more easily cleaned up. The basin typically, or in some cases by regulation will have a capacity of at least about 110% to about 125% of the capacity of the tank.

So-called "poly" tanks and containment basins are commonly used in chemical injection systems. Poly tanks are fabricated from polymers, such as high-density polyethylene (HDPE), cross-linked polyethylene (XLPE), cross-linked HDPE, and polypropylene (PP). Copolymers, such as polytetrafluoroethylene (PTFE), may be incorporated to reduce permeation through and degradation of the tank walls, or they may be provided with a PTFE matrix on the inside of the tank. Most commonly the tanks are produced by rotational molding. The polymer resin is added to a two-piece mold that is heated and slowly rotated both horizontally and vertically until the resin has cured.

Conventional poly tanks have had a generally cylindrical geometry. Traditionally, they are mounted over an open top basin on a metal frame, either with a horizontal or vertical orientation. The metal frame sits within, and rests on the bottom of the basin. Horizontally oriented tanks, that is, horizontal tanks typically are provided with molded-in feet to distribute the weight of the tank across the lower side of the tank. Vertical tanks usually have an essentially flat bottom.

The tank and pump typically are mounted somewhat above the rim of the basin, so that they are more easily installed and accessible for ongoing operations. When the tank is horizontally-oriented, it typically is secured to the frame by straps. One end of the straps may be connected to the tank. Alternately, the straps may loop over the tank, in which case the tank often has molded-in channels to ensure that the straps are held properly in place. Vertically-oriented tanks typically have rails running around the platform of the frame to closely restrict horizontal movement of the tank across the platform. The frames preferably have a continuous support surface, such as a plywood or metal sheet laid across frame members, to distribute load across the bottom of the tank and minimize stress points in the tank.

In general, poly tanks are well suited for use in chemical injection systems. Though not as sturdy and durable as, for example, steel tanks, they are much less expensive to make. Poly tanks also are much lighter and may be handled and shipped more easily and cheaply. They also may be more compatible with chemicals that have corrosive effects on steel tanks. Consequently, poly tanks are used in the vast majority of chemical injection systems used in the oil and gas industry.

Various aspects of their design, however, can make poly tanks susceptible to leakage, reduced service life, and other issues. Poly tanks, for example, typically comprise a variety of fittings, such as a bulkhead connection at the inlet and outlet of the tank. Threaded metal inserts also may be spin welded in the tank wall to allow straps to be connected to the tank. Such fittings and inserts often are situated below the tank's fill line. Especially if they are over tightened, they can create paths through which leakage can occur.

Bulkhead fittings for the tank outlet also typically extend through the sidewall of the tank near, but not at its bottom. That allows personnel to access the fitting more easily and creates a pressure head on the pump. Thus situated, however, a "heel" of fluid is created in the bottom of the tank that cannot flow out the outlet. Active ingredients and other components of the chemical solution can precipitate or flocculate out of solution and form sediments at the bottom of the tank. Such "fallout" or "dropout" tends to collect in the heel. Fallout tends to increase the rate of precipitation and sedimentation of fresh chemicals added to the tank. Moreover, when the tank is refilled, any fallout present is stirred up. It can readily flow out the tank and into the pump system where it can clog up downstream components. Relatively small check valves associated with the pump are especially susceptible to clogging up.

Poly tanks also are subject to chemical reactions, physical stresses, and environmental factors that can degrade the integrity of the tank and allow leakage. Some of the chemicals stored in the tank may have little or no effect, others a mild effect, but some can cause significant damage. Solvents such as toluene & xylene permeate HDPE tank walls, especially those that are non-fluorinated HDPE.

The "parting line" in poly tanks is particularly susceptible to such effects. That is, the parting line is a visible seam in the tank created during the rotational molding process along the line where the parts of the mold meet. Under perfect conditions, the parting line will be chemically and physically identical to other portions of the tank walls. Often, however, molding conditions are less than perfect, and the parting line may create a weak spot in the tank that is more susceptible to both chemical and physical degradation. Moreover, because it makes the molding process easier, the parting line often is situated below the fill line of the tank, near the middle of the tank.

Poly tanks also are subject to physical stress. Pressure within the tank increases and decreases with increasing and decreasing ambient temperatures, causing the tank to swell and collapse. The expansion and contraction of the tank creates cyclic stress in the tank that can lead to cracks. The parting line and areas around fittings that extend through the tank wall are especially susceptible to cyclic stress. So are horizontally oriented tanks. They typically are secured by straps. Especially if they are excessively tight, straps allow stress to build up by limiting expansion of relatively small portions of the tank while the rest of the tank expands.

Poly tanks also experience prolonged exposure to ultraviolet (UV) radiation from the sun. UV radiation can cause the tank to become more brittle and can break down the polymers and create chalkiness. It also can accelerate some of the deleterious chemical reactions occurring in the liquid chemicals and tank walls. While additives can mitigate some of those effects, UV radiation still can exacerbate many of the other issues with poly tanks.

Certain aspects of their design also create issues in installing and servicing systems for injecting chemicals. For example, and especially for larger, vertical poly tanks, a top fill port may be difficult to access from the ground. Workers may have to rely on ladders or lifts to manage filling of the tank. Alternately, the tank may have a bulkhead fitting near the tank bottom that allows connection of fill hoses, but that creates another weak point for potential leakage. Workers also may have to step inside the containment basin to access fittings on the tank. Moreover, large tanks, especially larger vertical tanks, can have a substantial wind profile. Especially when empty, they may not be stable in high winds and may be damaged or cause damage to other equipment on site.

Conventional systems for injecting chemicals also require a fair number of metal support frames. As noted, the chemical storage tank will be mounted on a support frame. The pump also is mounted on a metal frame, as is the controller. Solar panels and batteries, if incorporated in the system, also typically are mounted on metal frames. The frames supporting the tank and perhaps the pump extend inside the open containment basin. More likely than not, however, the frames supporting the controller, solar panels, and batteries are placed outside the containment basin. Thus, the system also can occupy a fairly large footprint at the well site.

Open containment basins also must be covered with netting primarily to prevent birds and other wildlife from getting into the basin. More recently, therefore, systems have incorporated poly basins with a covered or closed design to eliminate the need for netting. Any leakage from the tank lands on the top of the basin and flows into the basin through drain holes. Horizontal tanks may be mounted directly to the top of the closed containment basin. Likewise, vertical tanks may rest directly on the top of the basin. Other components, especially the pump, also may be mounted directly or indirectly to a closed basin. The need for metal framing may be greatly diminished or eliminated. Likewise, the footprint of the system may be reduced.

Closed poly containers may be molded with various structural features to increase their load capacity to allow more and heavier components to be mounted on their top. Such features, however, complicate the molding process. Moreover, when filled, larger tanks easily exceed the load capacity of highest rated closed poly basins, even if no other components of the system are mounted on the basin. Especially considering that the stress imparted by a tank may persist for extended periods of time, it is not commercially advisable to mount tanks having a capacity of more than about 330 gallons on the top surface of conventional closed poly basins. Tanks larger than about 550 are even more problematic and may cause more or less immediate issues.

Finally, it is important that the risk of failure and leaks be minimized. Leaks can lead to soil and water contamination and other harm to the environment. The treatment chemicals also can be expensive and, if lost because of tank failure, can represent a significant loss of capital. Moreover, non-compliance with safety standards can lead to significant fines. All that can impose significant costs on an operator if the tank fails.

The statements in this section are intended to provide background information related to the invention disclosed and claimed herein. Such information may or may not constitute prior art. It will be appreciated from the foregoing, however, that there remains a need for new and improved systems for dispensing liquid chemicals into fluid streams and for the tanks and containment basins used in those systems. Such disadvantages and others inherent in the prior art are addressed by various aspects and embodiments of the subject invention.

SUMMARY OF THE INVENTION

The subject invention, in its various aspects and embodiments, relates generally to systems for dispensing liquid chemicals and to chemical tanks and tank systems. One broad embodiment and aspect of the invention provides for a system for dispensing liquid chemicals, such a system for injecting liquid chemical additives into a fluid stream. The chemical dispensing system comprises a poly tank, a containment basin, a pump, and a first fluid line connecting the tank and the pump. The poly tank is adapted for storing and discharging the liquid chemicals. The containment basin has an open top and is adapted to receive the liquid chemicals in the event of leakage from the tank. The tank is nested in the containment basin such that a lower portion of the tank lies within the basin and an upper portion of the tank covers the open top of the basin. The tank comprises an inlet adapted to allow inflow of liquid chemicals into the tank and an outlet adapted to allow outflow of liquid chemicals. Both the inlet and outlet are provided in the upper portion of the tank. The pump is adapted for receiving the liquid chemicals from the tank and motivating the liquid chemicals.

Other embodiments provide such chemical dispensing systems where the poly tank is supported on the bottom of the basin.

Yet other embodiments provide such chemical dispensing systems where the upper portion of the tank is adapted to support solar panels installed on a first area of the top surface of the upper portion to support the pump installed on a second area of the top surface of the upper portion.

Still other embodiments provide such chemical dispensing systems where the top surface of the upper portion of the tank has one or more molded beams or pedestals.

Additional embodiments provide such chemical dispensing systems where the tank comprises molded pillars extending upwardly from the bottom of the tank.

Further embodiments provide such chemical dispensing systems where the tank comprises a parting line in the upper portion of the tank.

Other embodiments provide such chemical dispensing systems where the upper portion of the tank has an eave extending horizontally beyond and above top edges of the basin and the parting line is provided in the eave.

Yet other embodiments provide such chemical dispensing systems where the inlet comprises an extraction valve mounted in the upper portion of the tank.

Still other embodiments provide such chemical dispensing systems where the inlet extraction valve is adapted for coupling to a fill nozzle for flowing the liquid chemicals into the tank.

Additional embodiments provide such chemical dispensing systems where the inlet extraction valve is adapted for vapor-tight coupling to the fill nozzle.

Further embodiments provide such chemical dispensing systems where the outlet comprises an extraction valve mounted in the upper portion of the tank.

Other embodiments provide such chemical dispensing systems where the outlet extraction valve has a tube extending downward to a point proximate the bottom of the bottom portion of the tank and is adapted for coupling to the first fluid line.

Yet other embodiments provide such chemical dispensing systems where the tank comprises a pressure relief valve mounted in the upper portion of the tank.

Still other embodiments provide such chemical dispensing systems where the containment basin and the tank have a generally octagonal prismatic geometry, a generally rectangular prismatic geometry, or a generally cylindrical geometry.

Additional embodiments provide such chemical dispensing systems where the containment basin and the tank have complimentary geometries such that the tank is closely nested in the containment basin.

Further embodiments provide such chemical dispensing systems where the containment basin is a poly containment basin and the tank has a nominal capacity of at least about 330 gallons.

Other embodiments provide such chemical dispensing systems where the containment basin is a poly containment basin and the tank has a nominal capacity of at least about 550 gallons.

Yet other embodiments provide such chemical dispensing systems where the tank has a fill line below the parting line.

Still other embodiments provide such chemical dispensing systems where the tank has a fill line coincident with the open top of the basin.

Additional embodiments provide such chemical dispensing systems where the basin has a capacity at least as great as the actual capacity of the tank.

Further embodiments provide such chemical dispensing systems where the chemical dispensing system is a system for dispensing the liquid chemicals into a fluid stream transported through a conduit, and the chemical dispensing system comprises a second fluid line connecting the pump and the conduit.

Another broad embodiment and aspect of the invention provides methods of dispensing liquid chemicals, for example into a process tank or a fluid stream transported through a conduit. The method comprises providing the novel chemical dispensing systems, filling the tank with the liquid chemicals, and operating the pump to dispense the liquid chemicals from the tank, for example, into the process tank or the conduit through a second line running from the tank.

Yet other broad embodiments and aspects of the invention provide tank systems for storing and containing liquid chemicals. The novel tank systems comprise a poly tank and a containment basin. The poly tank is adapted for storing and discharging the liquid chemicals. The containment basin has an open top and is adapted to receive the liquid chemicals in the event of leakage from the tank. The tank is nested in the containment basin such that a lower portion of the tank lies within the basin and an upper portion of the tank covers the open top of the basin. The tank comprises an inlet adapted to allow inflow of the liquid chemicals into the tank and an outlet adapted to allow outflow of the liquid chemicals. Both the inlet and the outlet are provided in the upper portion of the tank.

Other embodiments provide such tank systems where the tank comprises a parting line in the upper portion of the tank.

Yet other embodiments provide such tank systems where the upper portion of the tank has an eave extending horizontally beyond and above top edges of the basin and the parting line is provided in the eave.

Still other embodiments provide such tank systems where the tank has a fill line below the parting line.

Additional embodiments provide such tank systems where the tank has a fill line coincident with the open top of the basin.

Further embodiments provide such tank systems where the basin has a capacity at least as great as the actual capacity of the tank.

Still other broad embodiments and aspects of the invention provide poly tanks adapted for storing liquid chemicals The poly tanks comprise a lower portion and an upper portion. The upper portion provides an eave extending above and horizontally beyond the lower portion of the tank. The poly tanks also have an inlet adapted to allow inflow of the liquid chemicals into the tank and an outlet adapted to allow outflow of the liquid chemicals. Both the inlet and the outlet are provided in the upper portion of the tank. The poly tanks are adapted to nest in a containment basin having an open top such that the lower portion of the tank lies within the containment basin and the eave of the tank covers the open top of the containment basin.

Other embodiments provide such tanks where the tank comprises a parting line in the upper portion of the tank.

Finally, still other aspects and embodiments of the invention will have various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the way it may be practiced. The subject invention encompasses other embodiments consistent with the disclosure and claims set forth herein.

Figure 1:
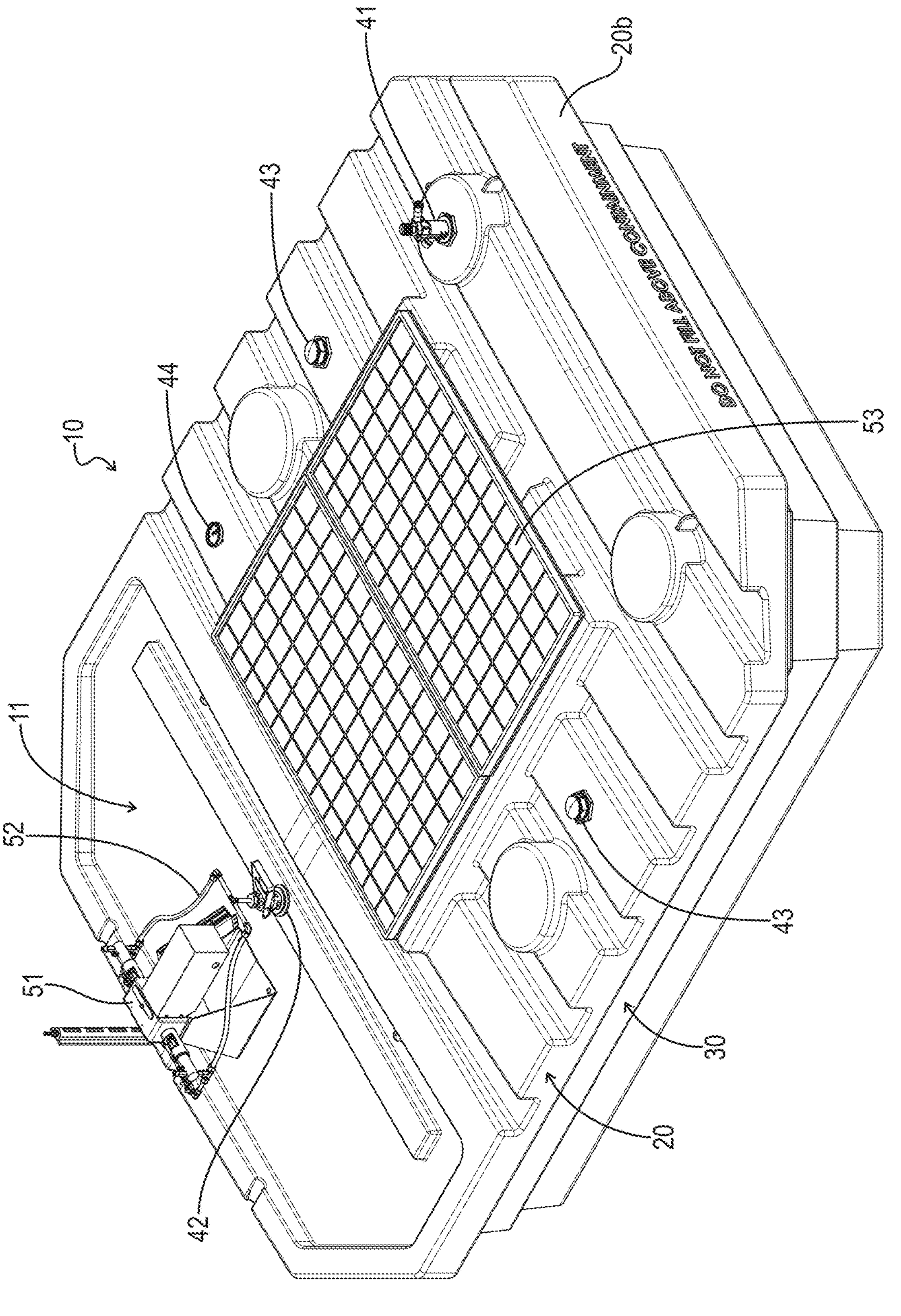
FIG. 1 is an isometric view of a preferred embodiment 10 of the novel chemical treatment systems of the subject invention, which system 10 comprises a preferred embodiment 11 of the novel chemical tank systems of the subject invention comprising a tank 20 and a containment basin 30.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to systems for dispensing liquid chemicals required for industrial processes, and more particularly, to chemical dispensing tanks used in such systems. The systems may be used, for example, to inject liquid chemicals into oil and gas wells and into pipelines used to produce and transport production fluids from the wells.

Some of those embodiments are described in some detail herein. For the sake of conciseness, however, all features of an actual implementation may not be described or illustrated. In developing any actual implementation, as in any engineering or design project, numerous implementation-specific decisions must be made to achieve a developers' specific goals. Decisions usually will be made consistent within system-related and business-related constraints, and specific goals may vary from one implementation to another. Development efforts might be complex and time consuming and may involve many aspects of design, fabrication, and manufacture. Nevertheless, it should be appreciated that such development projects would be a routine effort for those of ordinary skill having the benefit of this disclosure.

Novel Chemical Treatment Systems

A first preferred system 10 for dispensing liquid chemical additives is shown in FIG. 1. It may be used, for example, to inject liquid chemicals into a fluid stream flowing through a conduit, such as the casings and production tubulars in oil and gas wells and the pipelines transporting production fluids downstream for storage or processing. Chemical injection system 10 comprises a first preferred embodiment 11 of the novel tank systems. Tank system 11 comprises a first preferred embodiment 20 of the novel tanks and a containment basin 30. Tank 20 is a "poly" tank and is adapted for storing and discharging liquid chemicals. Containment basin 30 is adapted to receive and contain any liquid chemicals that leak from tank 20.

Figure 8:
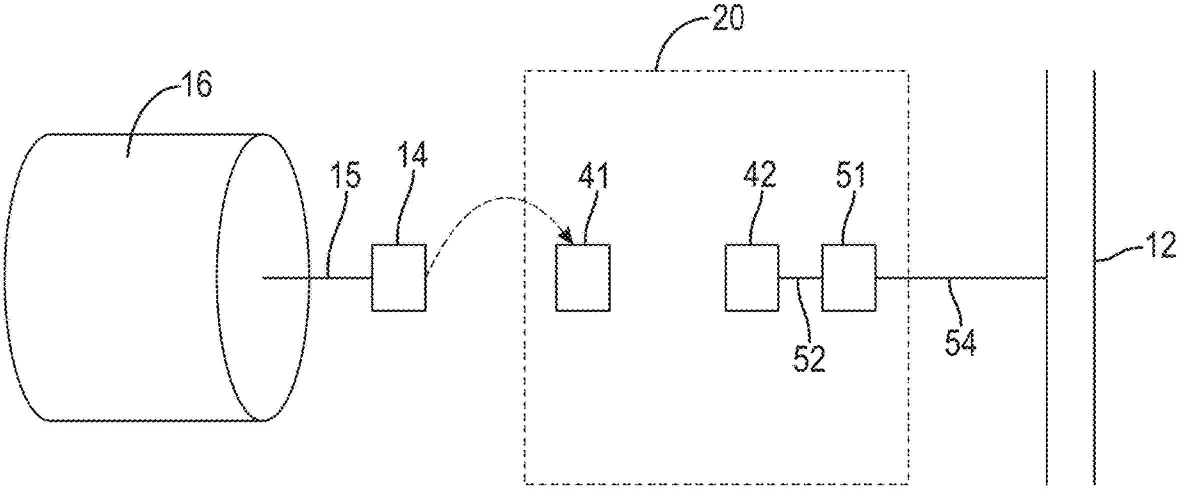
FIG. 8 is a schematic illustration of novel tank 20 where a pump 51 is feeding liquid chemicals from tank 20 through a discharge line 54 into a conduit 12 and tank 20 is being filled from a supply tank 16 through a hose 15 and a nozzle 14.

Chemical injection system 10 also comprises a pump 51. Pump 51 receives fluids from tank 20 through a feed line 52. Pump 51, as shown schematically in FIG. 8, then pumps fluids through a discharge line 54 into a conduit 12. Conduit 12, for example, may be a pipeline transporting production fluids downstream from an oil and gas well. Preferably, as shown in FIG. 1, pump 51 is mounted on the top 23 of poly tank 20. It may be mounted, for example, by bolts threaded into threaded inserts provided in top 23 of tank 20. It also will be appreciated that top 23 of tank 20 can easily accommodate up to three pumps 51, each injecting chemicals into, for example, three different wells.

Pump 51, as generally illustrated in FIG. 1, most commonly will be a reciprocating piston pump. Reciprocating piston pumps can inject the chemicals accurately and precisely, can deliver chemicals in high pressure systems, are suitable for both batch processes and continuous injection, and are durable and reliable. Suitable piston pumps may be either single-acting or double-acting and may have either fixed or variable stroke lengths. Most commonly, electrically powered piston pumps will be used as they provide more precise control over injection rates. Pneumatically and hydraulicly powered piston pumps, however, may be used, for example in offshore applications where extremely high pressures are present in the well and the offshore rig can accommodate the extra equipment required for fluid-driven pumps.

Other types of pumps, however, may be used, such as diaphragm, progressive cavity, and centrifugal pumps depending primarily on the required discharge rate and viscosity of the fluid. In any event, a wide variety of conventional pumps are available commercially and may be used in the novel chemical injection systems. Suitable electrically-powered piston pumps, for example, are available from TXAM Pumps, Houston, Texas (www.texampumps.com).

The operation of pump 51 preferably is controlled by an electronic controller (not shown). Like pump 51, if desired the controller can be mounted on top 23 of poly tank 20. Suitable controllers include those that incorporate a printed circuit board (PLC), or programable controllers incorporating a microcontroller or PLC chip. They are used primarily to control the timing and duration of pump cycles and preferably to log data on injection volumes and pump operation. Preferably, the control system incorporates sensors that provide signals to the controller so that it can monitor and adjust operation of the pump based on flow rates of chemicals through the pump or of fluids in the pipeline. Sensors also preferably are provided to monitor fluid level in the tank. Controllers allowing remote communication, for example, via hard wired or wireless internet connections also are preferred. Suitable controllers are available, for example, from TXAM Pumps.

Especially where it is not practical to connect the system to a power grid, the novel chemical injection systems preferably incorporate systems for generating and storing electrical power. Novel chemical injection system 10, for example, has a pair of solar panels 51 mounted on top of tank 20. Solar panels 51 are connected to the controller and, through the controller, to battery storage (not shown). The selection and arrangement of components for solar power generating systems are well known and may be deployed as desired by workers in the art. Other systems, such as wind turbines, also may be used to generate electrical power when the chemical injection system cannot be connected to a power grid.

Novel Tank Systems

Figure 2:
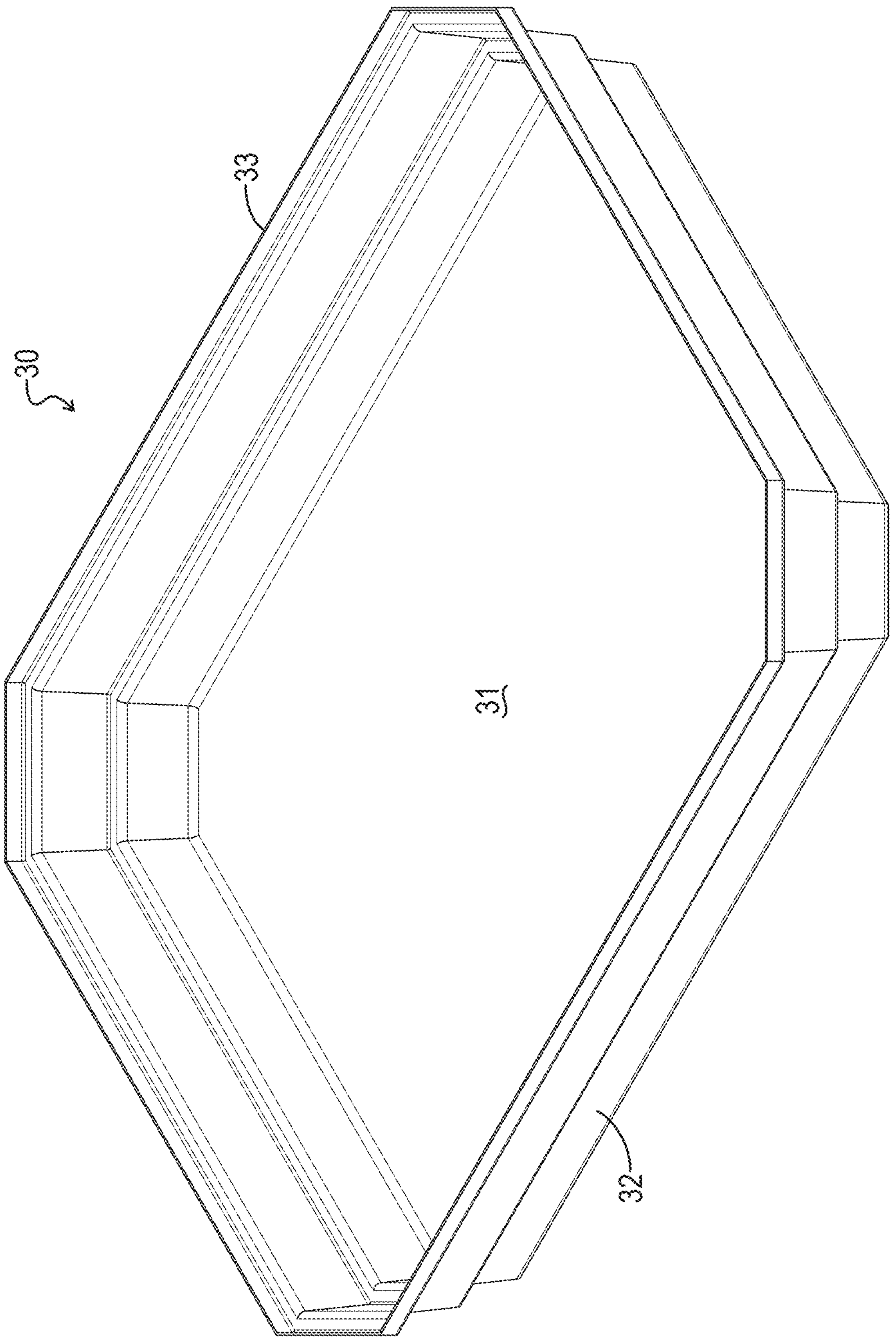
FIG. 2 is an isometric view of containment basin 30 shown in FIG. 1.
Figure 3:
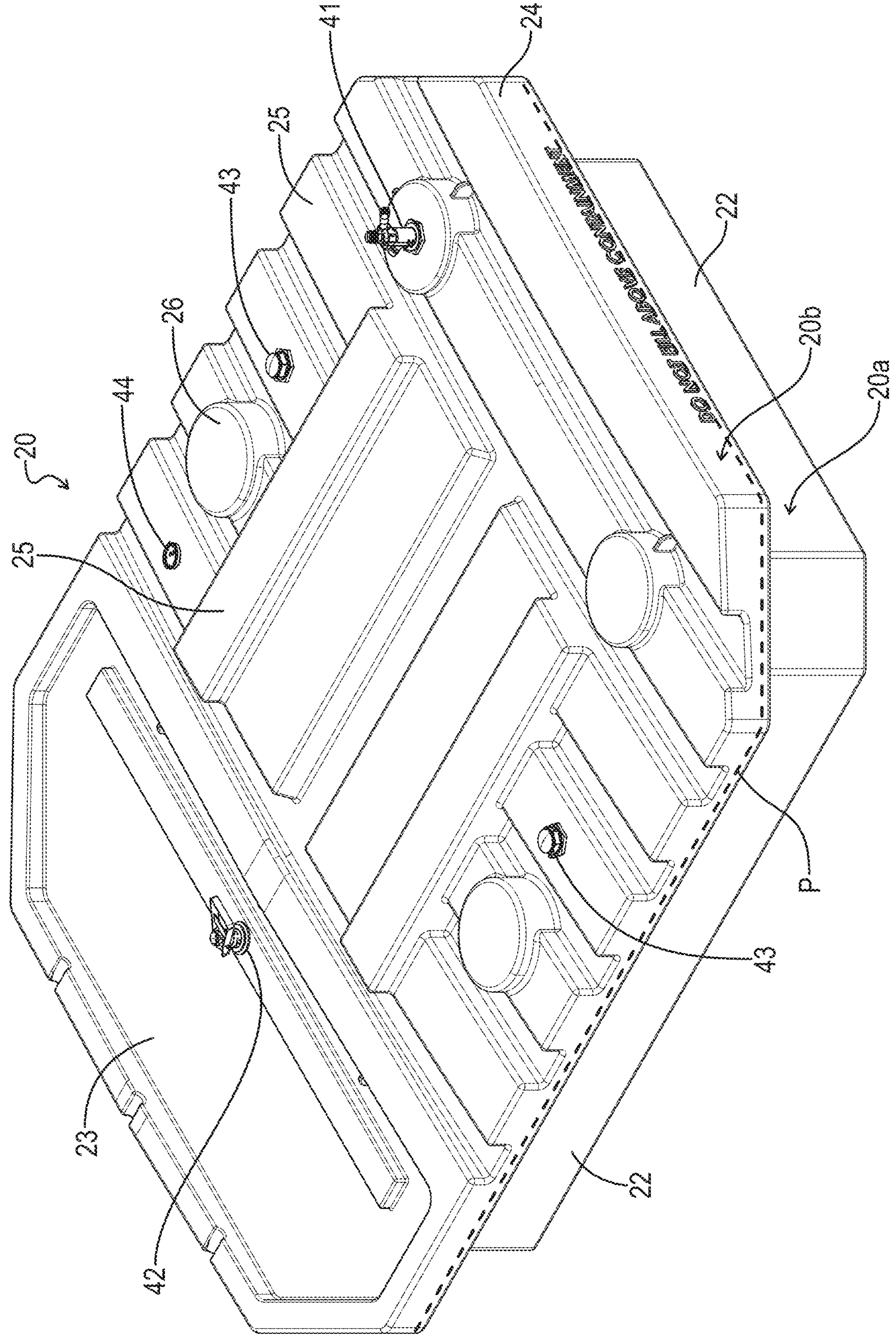
FIG. 3 is an isometric view of tank 20 shown in FIG. 1.
Figure 4:
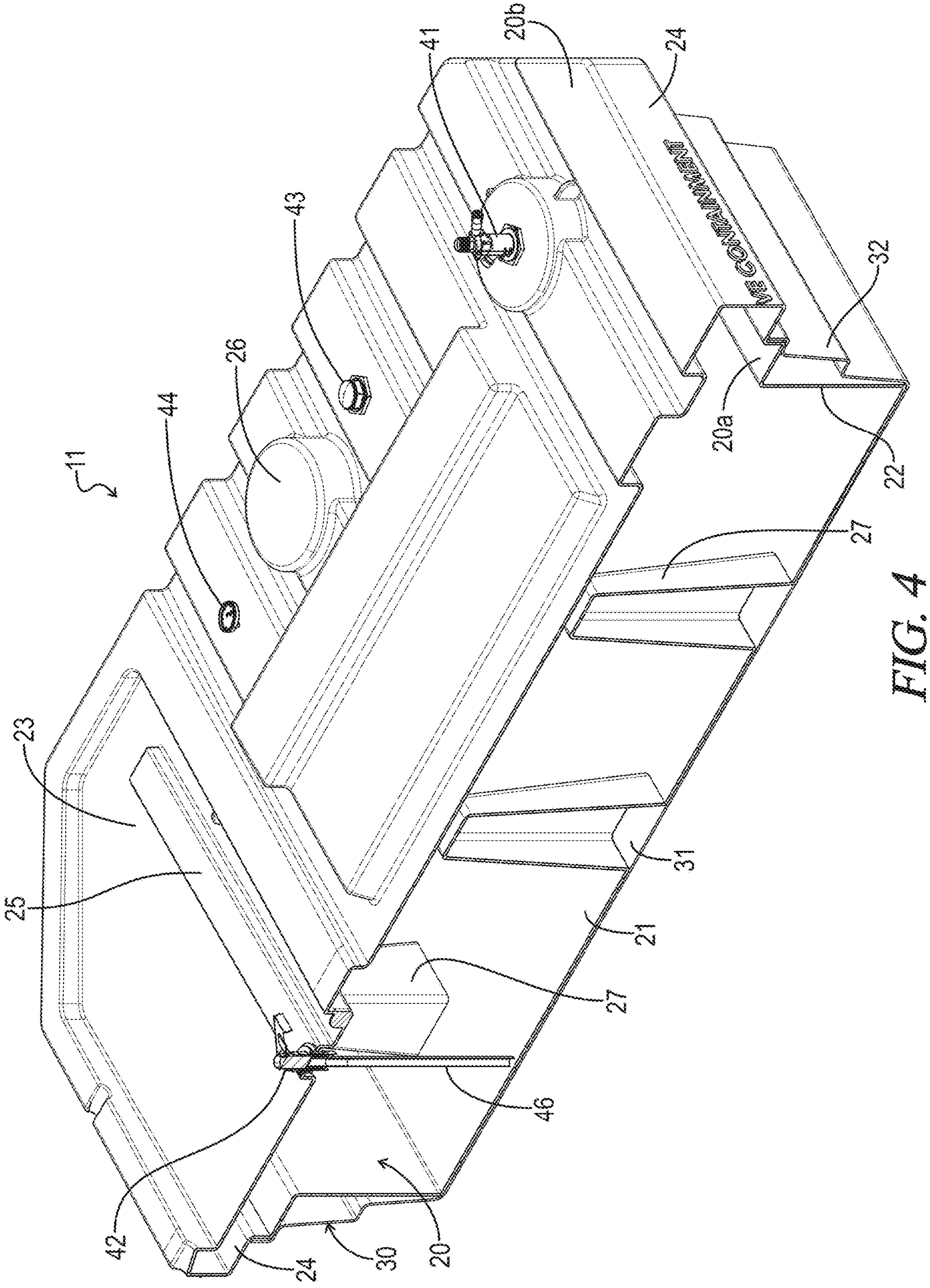
FIG. 4 is an isometric, cross-sectional view of chemical tank system 11 shown in FIG. 1.
Figure 5:
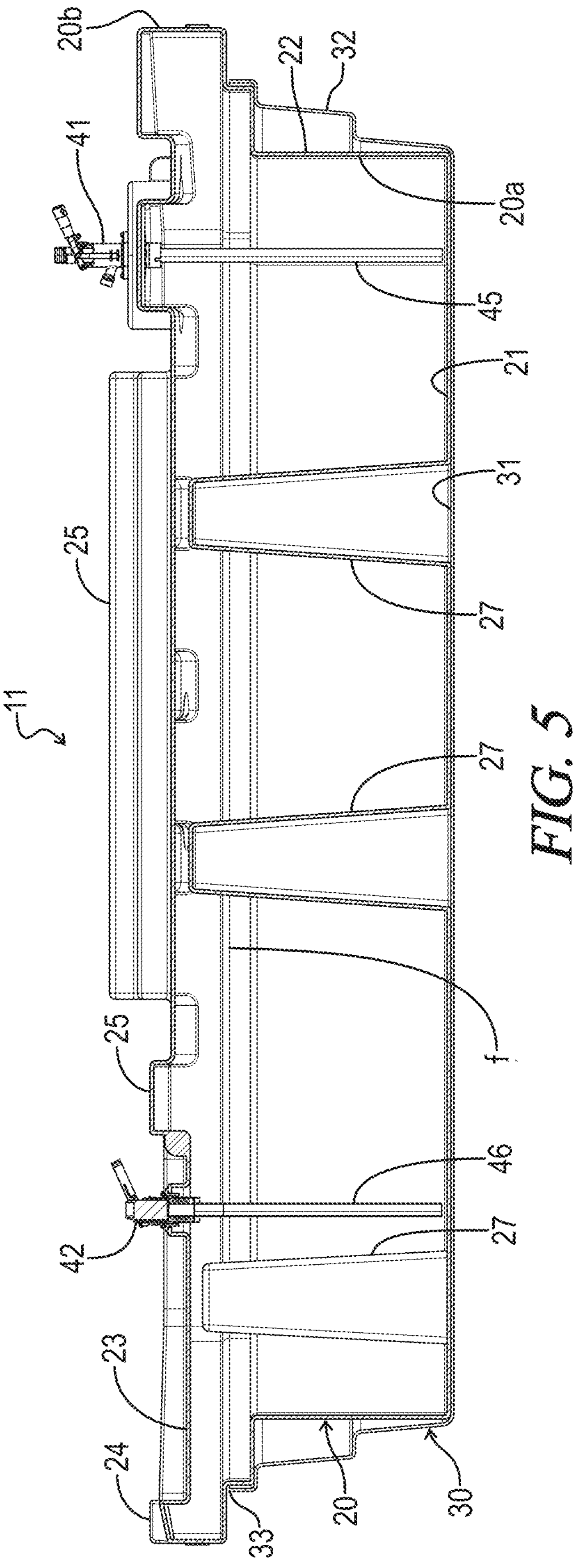
FIG. 5 is an axial, cross-sectional view of chemical tank system 11.

A first preferred embodiment 11 of the novel tank systems is shown in FIGS. 1 and 4-5. As shown therein, tank system 11 comprises tank 20 and containment basin 30. Containment basin 30, as appreciated best from FIG. 2, is in essence an open top tub. As noted, it will receive and contain any fluids that may leak from tank 20. Tank 20, as appreciated best from FIG. 3, is a substantially closed container. As described further, it has a lower portion 20*a* and an upper portion 20*b*.

Tank 20 is a poly tank. As noted, poly tanks are widely used for storing liquid chemicals and are fabricated from polymers such as HDPE, XLPE, cross-linked HDPE, and polypropylene. When permeation is a particular concern, tank 20 preferably will incorporate PTFE copolymers or matrices. It is fabricated by a rotational molding process. Tank 20 thus has a parting line P (shown in FIG. 3) where the top section of the mold used to fabricate tank 20 met the bottom section of the mold. Parting line P extends through upper portion 20*b* of tank 20. Basin 30 also is preferably fabricated from the same types of polymers as tank 20. Given that basin 30 has an open top, however, it typically would be fabricated by injection molding.

Tank 20, as shown in FIGS. 1 and 4-5, is nested in containment basin 30. Preferably, lower portion 20*a* of tank 20 lies within basin 30 while upper portion 20*b* extends above and over basin 30. More specifically, the bottom 21 of tank 20 rests and is supported on bottom 31 of basin 30. Preferably, as shown, tank 20 and basin 30 have complimentary geometries so that tank 20 closely nests within basin 30. Both have a generally octagonal prismatic geometry. Basin 30 has a flat, octagonal bottom 31 from which extend octagonally arranged side walls 32. Side walls 32 extend generally upward and terminate in octagonally-shaped top edges 33, thus providing basin 30 with an open top. Tank 20 also has an octagonal bottom 21, the majority of which is flat and lies in a common plane. Octagonally arranged side walls 22 extend generally upward from bottom 21. A top 23 extends across the top of tank side walls 22.

Side walls 22 and 32 of, respectively, tank 20 and basin 30 extend generally upward, but have a stepped profile. Side walls 32 of containment basin 30 have two lower mostly vertical surfaces that flare slightly outward, an upper vertical surface, and two short connecting horizontal surfaces. Side walls 22 of tank 20 have three vertical surfaces with two connecting horizontal surfaces. As best seen in FIGS. 4 and 5, the lower horizontal surfaces in side walls 22 of tank 20 extend over the upper horizontal surfaces in side walls 32 of basin 30. The mid-vertical surfaces of side walls 22 of tank 20 extend concentrically and closely within the upper vertical surfaces of side walls 32 of basin 30.

The upper horizontal surfaces in tank side walls 22 extend over top edges 33 of basin 30. The upper vertical surfaces of tank side walls 22 extend concentrically beyond the upper vertical surfaces of side walls 32 of basin 30. Upper portion 20*b* of tank 20 is thus provided with a rim or eave 24 extending from its periphery. Eave 24 extends horizontally beyond and just above top edges 33 of basin 30. Upper portion 20*b* of tank 20 thus completely covers the open top of basin 30 and prevents the ingress of wildlife, rain, or other environmental elements into basin 30.

The fill line, that is the level at which tank 20 is filled to reach its rated capacity, preferably is somewhat below parting line P in tank 20 so that in general parting line P is not exposed to liquid in tank 20. The fill line also may be somewhat below, but preferably is generally coincident with top edges 33 of basin 30. If tank 20 begins to leak, therefore, basin 30 will have sufficient capacity to contain the entire volume of chemicals in tank 20. At the same time, however, operators may "overfill" tank 20, up to maximum actual capacity of tank 20. For that reason, basin 30 preferably is sized relative to tank 20 such that it has a capacity at least as great as, and preferably somewhat greater than the actual capacity of tank 20. For example, containment basin 30 preferably has a capacity of from about 110% to about 125% of the actual capacity of tank 20.

Figure 6:
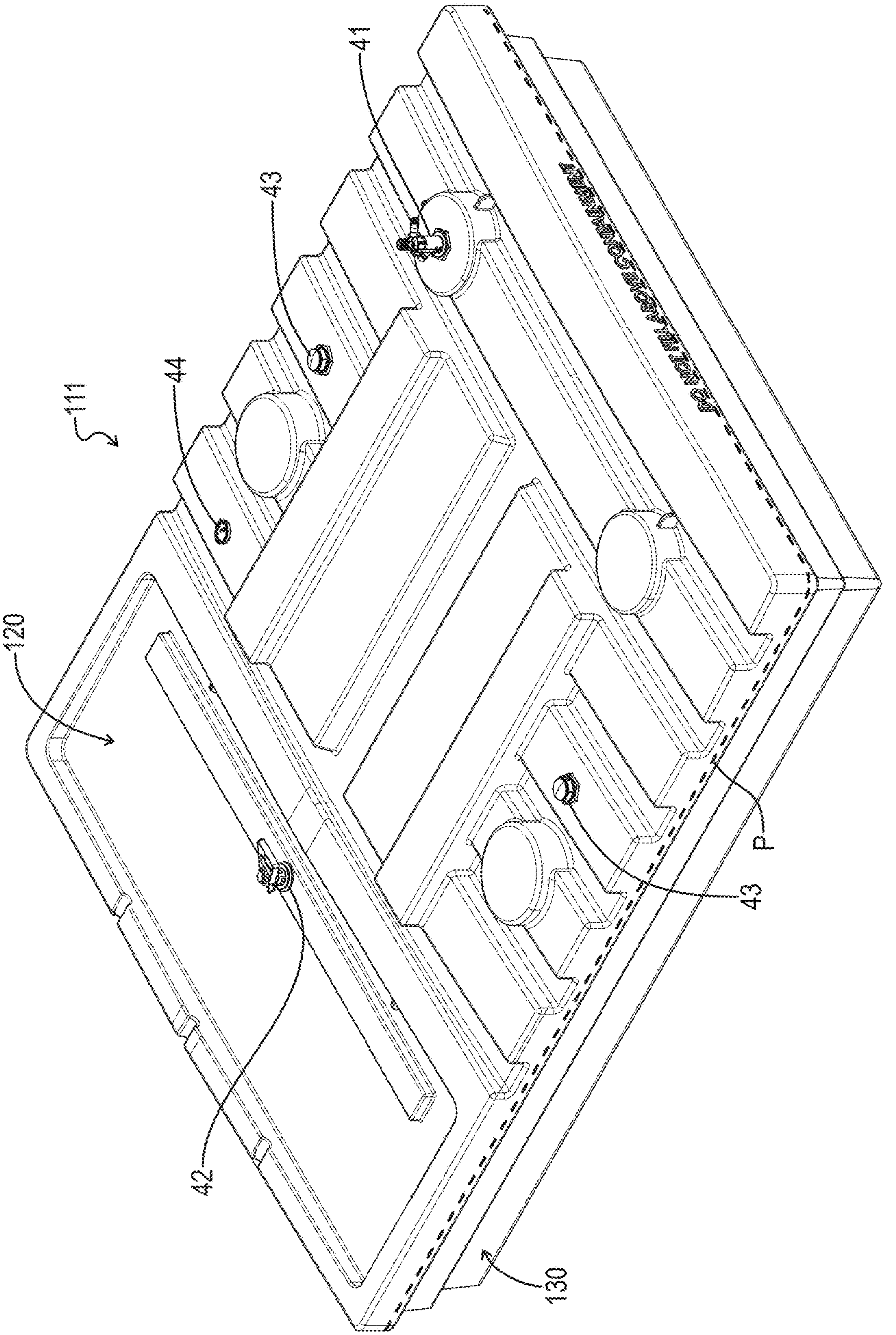
FIG. 6 is an isometric view of a second preferred embodiment 111 of the novel chemical tank systems of the subject invention comprising a tank 120 and a containment basin 130.
Figure 7:
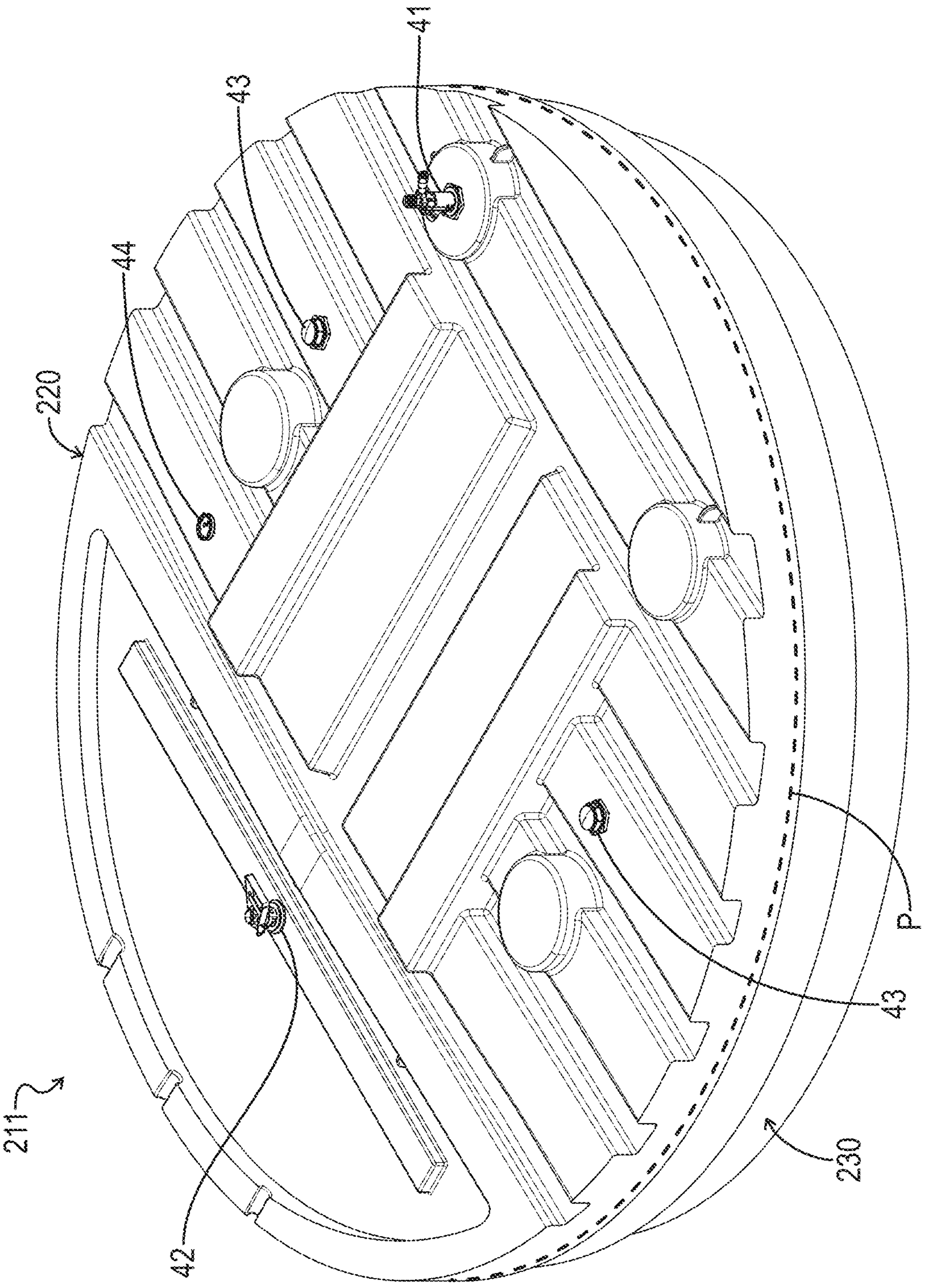
FIG. 7 is an isometric view of a third preferred embodiment 211 of the novel chemical tank systems of the subject invention comprising a tank 220 and a containment basin 230.

Tank 20 and basin 30 (other than its open top) have generally octagonal prismatic geometries. That is, while tank 20 incorporates various molded in features as discussed below, and the sidewalls of both tank 20 and basin 30 have stepped profiles, the overall shape of tank 20 and basin 30 would be recognized by workers in the art as octagonal prisms. Tank 20 and basin 30, however, may have other geometries as desired. For example, they may have generally rectangular prismatic geometries, as does tank system 111 shown in FIG. 6, or generally cylindrical geometries, as does tank system shown in FIG. 7. Likewise, the profile of tank side walls 22 and basin side walls 32 may be varied from the exemplified stepped profile. It also will be appreciated that those portions of tank side walls 22 and basin side walls 32 described as extending vertically in practice typically will have at least a modest outward flare. The novel tanks and preferably the basins incorporated into the novel tank systems are molded products, and such tapers allow easier release from the molds.

Top 23 of tank 20 preferably is profiled to shed water. Additionally, tank 20 preferably is provided with molded in features to increase the load capacity of tank top 23. For example, as may be seen in FIG. 3, tank top 23 may be provided with molded-in beams 25 and pedestals 26. As shown in the cross-sectional views of FIGS. 4-5, tank 20 also may be provided with internal, molded-in pillars 27. Pillars 27 extend upward from bottom 21 of tank 20 to just under tank top 23. Under load, top 23 of tank 20 will flex slightly downward until they bear on pillars 27. Pillars 27 will provide support for tank top 23 and help minimize further deformation. The number, dimensions, and arrangement of such features may be varied as desired in accordance with principles well known to workers in the art.

As seen best in FIG. 3, tank 20 has an inlet, in which a fill valve 41 is mounted, and an outlet, in which a dispensing valve 42 is mounted. The inlet and outlet are both provided in upper portion **20*b* of tank 20 and preferably extend through top 23 of tank 20. Inlet valve 41 and dispensing valve 42 regulate the flow of chemicals, respectively, into tank 20 and out of tank 20 towards pump 51**.

Inlet valve 41 and dispensing valve 42 preferably are extraction valves. Preferably, they are provided with features that allow valve 41 and valve 42 to be easily coupled to fluid lines as needed. For example, as shown schematically in FIG. 8, inlet valve 41 preferably is configured to allow it to be coupled easily to a nozzle 14 of a hose running from a supply tank 16. Dispensing valve 42 preferably is configured to couple easily to feed line 52 leading to pump 51. Extraction valves 41 and 42 also provide a closed or "vapor tight" connection. That is, the coupling not only allows transfer of liquid from supply tank 16 to tank 20 and from tank 20 to pump 51, but it also prevents vapors within the tank from escaping into the atmosphere and atmospheric gases from entering the tank during filling and dispensing operations. Providing the tank with a substantially closed system not only minimizes escape of potentially damaging chemical vapors into the environment, but also avoids potentially costly loss of chemicals through evaporation.

Inlet extraction valve 41 and outlet extraction valve 42 also preferably are made of chemically resistant materials, such as polyethylene, polypropylene, glass-filled polyethylene, glass-filled polypropylene, acrylonitrile butadiene styrene (ABS), and stainless steel and other corrosion resistant alloys. Metallic valves may be preferred, however, as they may be grounded to avoid buildup of static electricity and sparks that may result therefrom. Preferably, the valves will have a terminal for connecting a ground wire.

Inlet extraction valve 41 and outlet extraction valve 42 preferably have, respectively, tubes 45 and 46 extending downward into tank 20 to a point proximate bottom 21 of tank 20, as may be seen in FIG. 5. Preferably, check valves (not shown) are provided near the bottom and top of tubes 45 and 46. Tubes 45 and 46 preferably are made of chemically resistant materials, such as polyethylene, polypropylene, nylon, and other thermoplastic polymers, stainless steel and other corrosion resistant alloys, and steel and plastic composites.

Suitable extraction valves are available commercially from various manufacturers, such as Micro Matic USA, Inc., Brooksville, Florida (micromatic.com), Entegris, Billerica, Massachusetts (entegris.com), and Colder Products, Arden Hills, Minnesota (cpcworldwide.com). While extraction valves are preferred, except as mentioned, their specific design in general forms no part of the invention. If desired, however, other conventional valves or devices for controlling flow through the inlet and outlet in tank 20 may be used. A threaded cap, for example, may be used to open and close the tank inlet.

Preferably, tank 20 also is provided with pressure relief valves 43 in its top 23 as may be seen in FIG. 3. In the event pressure within tank 20 exceeds design parameters, pressure relief valves 43 will allow gas to vent. They preferably are fabricated from chemical resistant materials, such as thermoplastics and corrosion resistant steels. Typically, they will be spring-loaded, self-operating check valves, such as those containing a spring-loaded poppet or diaphragm. They also are preferably dual-function pressure relief valves that also vent atmospheric gases into the tank to avoid vacuum collapse of the tank or to ensure flow of fluid to pump 51. Less commonly, they may be electronically actuated valves that are controlled by an electronic controller in response to signals received from a pressure transducer or other pressure sensor. Suitable pressure relief valves are commercially available.

Tank 20, as shown in FIG. 3, also preferably is provided with a depth gauge 44, and more preferably a digital gauge connected to a controller that then may provide an indication of flow rates out of the tank and how much liquid remains in the tank. Pressure transducers may be used, but depending on the specific chemicals in the tank, contactless digital depth gauges, such as ultrasonic or microwave level sensors, may be preferred. Suitable contactless level sensors are commercially available.

It will be appreciated that novel tank system 11 and novel tank 20, and other preferred embodiments of the subject invention, provide several important advantages over conventional poly tanks, poly tank systems, and chemical injection systems. For example, tank system 11, incorporates open basin 30. Nevertheless, because tank 20 incorporates eave 24 that extends over and covers basin 30, basin 30 is in essence a closed basin. Netting is not required to prevent birds and other wildlife from getting into the basin. Moreover, open basin 30 may be fabricated more easily and economically than conventional closed basins.

While it has the benefits associated with conventional tank systems incorporating a closed basin, tank system 11 may be sized as desired to incorporate poly tanks 20 having even the largest capacities regardless of their weight. Tanks having capacities of 1,000 gallons, perhaps even 1,500 gallons, for example, may be required for treatment of some oil and gas wells. In conventional tank systems having a closed basin, the tank is mounted on top of the closed basin. Given the structural limitations of conventional closed basins and the weight of storage tanks when filled, such systems are necessarily limited to relatively small tanks. As a practical matter, they are limited to tanks having a capacity of about 330 gallons or less, and certainly to tanks having a capacity of about 550 gallons or less. Tank 20 in novel tank system 11, however, rests on bottom 31 of basin 30. Its weight and, therefore, its capacity are largely inconsequential as basin 30 generally will be deployed on the ground. Tank 20 also does not require a support frame, nor are straps or any other type of restraint needed to limit movement of tank 20. It nests within basin 30.

Tank 20, because it nests within basin 30, also does not require threaded inserts to connect straps or other tie-downs.

Any threaded fittings that may be required for mounting system components on tank 20 may be provided in tank top 23. Inlet valve 41 and outlet valve 42 also are mounted in tank top 23. The fill line of tank 20, that is, the level at which tank 20 is filled to reach its rated or nominal capacity, is generally coincident with the top edges 33 of basin 30. Any threaded inserts and other fittings, therefore, are located above the fill line of tank 20, as is parting line P. Even if tank 20 is filled beyond its rated capacity, exposure to chemicals will be of limited duration, only until the excess fluid is drawn out. In conventional, cylindrical poly storage tanks, many, if not all threaded inserts and fittings are situated well below the fill line, near the bottom of the tank, and are more or less continually exposed to fluid. Often the parting line is as well. Novel tank 20 has none of those potential leak points.

As noted, outlet valve 42 of tank 20 preferably is an extraction valve having a tube 46 that extends downward almost to bottom 21 of tank 20. Thus, unlike conventional cylindrical poly tanks, the "heel" of fluid that cannot flow out of tank 20 is minimized. Dropout of chemical particulates and flocculants is thereby minimized. Moreover, because it must rise through tube 46, whatever dropout is present in tank 20 is not able to flow into the pump system as easily. Clogging of pump components, such as small check valves, is reduced.

Moreover, because it nests within basin 30, lower portion 20*a* of tank 20, that is, most of tank 20, including essentially all portions exposed to chemicals, is shielded from potentially damaging UV radiation. An air gap also is created between lower portion 20*a* of tank 20 and basin 30. The gap helps insulate tank 20 from changing ambient temperatures. Expansion and contraction of tank 20, and the cyclic stress created thereby, to that extent will be moderated and more gradual. Other factors being equal, it is expected that the service life of tank 20 will be extended accordingly.

It also will be appreciated that the novel tanks and tank systems greatly reduce or eliminate the need to provide supporting frames for other components of chemical injection system 10. As noted, unlike conventional cylindrical poly tanks, a support frame is not required for tank 20. It nests with basin 30. As may be seen in FIG. 1, pump 51 and solar panels 53 may be mounted directly on top 23 of tank 20, as may be a controller for chemical injection system 10. By eliminating the need for multiple support frames that otherwise may be required, chemical dispensing systems incorporating the novel tank systems are simpler, easier to assemble, and are less costly to fabricate and assemble.

The novel tanks in large part may be sized to provide whatever capacity may be desired. Poly tanks in the oil and gas industry, for example, most commonly have nominal capacities from about 65 to about 1,000 gallons, less commonly up to 1,500 gallons. More importantly, however, the novel tanks may be sized up or down while still providing workers easy access to the tank and other system components during installation and maintenance operations. Poly tank 20, for example, may be sized for a nominal capacity of 1,000 gallons. So sized, inlet valve 41 and outlet valve 42, as well as pump 51 and solar panels 53, would only be a bit over two feet above grade. Those components are readily accessible to workers standing on the ground next to tank system 11.

In contrast, a vertically oriented, conventional cylindrical poly tank having a nominal capacity of 1,000 gallons typically would have a vertical axis of at least about 7.5 feet. Smaller cylindrical tanks, such as nominal 550-gallon tanks, whether oriented vertically or horizontally, would have a vertical rise of between about 4.5 and about 5.5 feet. Those conventional tanks, depending on the basin used, also would be mounted at least 1 or 2 feet above grade.

Thus, with conventional tank systems, workers would require ladders or lifts to reach a top fill port in larger capacity cylindrical tanks. Alternately, a fill port and bulkhead fitting may be provided near the bottom of larger cylindrical tanks, but that creates another weak area through which leaks may develop. Workers also still may have to remove netting and stand inside an open basin to access system components.

In the novel tanks, however, inlet and outlet valves, for example, may be mounted in the top of the tank, well above fluid levels, and still remain readily accessible for workers, even in tanks having larger capacities. Indeed, by increasing the horizontal dimensions, novel tanks having even larger capacities may be provided. There is no need to significantly increase the height of the novel tanks to increase the capacity of the tank. Not only will they remain easily accessible for maintenance, the novel tanks also will have a comparatively small wind profile and will be less susceptible to damage caused by high winds.

The novel chemical injection systems, tanks systems, and tanks have been described primarily in the context of the oil and gas industry, especially in regard to chemically treating oil and gas wells and pipeline systems used to convey oil and gas. They are well suited for operating in open, uncontrolled environments, in remote locations, and where onsite inspection and monitoring may be infrequent. It will be appreciated, however, that they may be widely applied in other industries and processes that may require storage of chemicals, containment basins to capture leaks from chemical storage tanks, and systems to dispense stored chemicals.

For example, they will have wide applicability in the petrochemical industry and the production of industrial and consumer products derived from hydrocarbons. Likewise, they may be used in food and beverage processing, water and wastewater treatment, the manufacture of pharmaceutical, cosmetic, and personal care products, mining and mineral processing, production and application of agricultural products such as fertilizer, pesticides, and herbicides; semiconductor and electronics manufacturing, and processing and manufacturing pulp and paper products. Similarly, they may be used to dispense fluids into fluid streams, such as flowing liquids and gas and fluidized particle streams, or into batch processing tanks and mixers.

While this invention has been disclosed and discussed primarily in terms of specific embodiments thereof, it is not intended to be limited thereto. Other modifications and embodiments will be apparent to the worker in the art.

What is claimed is:

1. A system for dispensing liquid chemicals comprising:

(a) a poly tank adapted for storing and discharging liquid chemicals;

(b) a containment basin having a bottom and an open top and adapted to receive the liquid chemicals if the liquid chemicals leak from the tank; wherein:

i) the tank comprises:

(1) walls;

(2) a bottom;

(3) a lower portion;

(4) an upper portion having a top surface and an eave defined by the walls of the tank;

(5) an inlet provided in the upper portion of the tank and adapted to allow inflow of the liquid chemicals into the tank; and (6) an outlet provided in the upper portion of the tank and adapted to allow outflow of the liquid chemicals; and ii) the tank is nested in the containment basin such that the lower portion of the tank lies within the basin and the eave in the upper portion of the tank extends horizontally beyond and above top edges of the basin;

(c) a pump adapted for receiving the liquid chemicals from the tank and motivating the liquid chemicals; and (d) a first fluid line connecting the tank and the pump.

2. The system of claim 1, wherein the bottom of the poly tank has a flat surface and the bottom of the basin has a flat surface and the flat surface of the bottom of the poly tank is supported on the flat surface of the bottom of the basin.

3. The system of claim 1, wherein the upper portion of the tank:

(a) is adapted to support solar panels installed on a first area of the top surface of the upper portion; and (b) is adapted to support the pump installed on a second area of the top surface of the upper portion.

4. The system of claim 1, where the top surface of the upper portion of the tank has one or more molded beams or pedestals.

5. The system of claim 1, wherein the tank comprises molded pillars extending upwardly from the bottom of the tank.

6. The system of claim 1, wherein the tank comprises a parting line in the upper portion of the tank.

7. The system of claim 6, wherein the parting line is provided in the eave.

8. The system of claim 1, wherein the inlet comprises an extraction valve mounted in the upper portion of the tank.

9. The system of claim 8, wherein the inlet extraction valve is adapted for coupling to a fill nozzle for flowing the liquid chemicals into the tank.

10. The system of claim 9, wherein the inlet extraction valve is adapted for vapor-tight coupling to the fill nozzle.

11. The system of claim 1, wherein the outlet comprises an extraction valve mounted in the upper portion of the tank.

12. The system of claim 11, wherein the outlet extraction valve has a tube extending downward to a point proximate the bottom of the tank and is adapted for coupling to the first fluid line.

13. The system of claim 1, where the tank comprises a pressure relief valve mounted in the upper portion of the tank.

14. The system of claim 1, wherein the containment basin is a poly containment basin and the tank has a nominal capacity of at least about 330 gallons.

15. The system of claim 1, wherein the containment basin is a poly containment basin and the tank has a nominal capacity of at least about 550 gallons.

16. The system of claim 6, wherein the tank has a fill line below the parting line.

17. The system of claim 1, wherein the tank has a fill line coincident with the open top of the basin.

18. The system of claim 1, wherein the basin has a capacity at least as great as an actual capacity of the tank.

19. The system of claim 1, wherein:

(a) the system is a system for dispensing the liquid chemicals into a fluid stream transported through a conduit; and (b) the system comprises a second fluid line connecting the pump and the conduit.

20. A method comprising:

(a) providing the system of claim 19;

(b) filling the tank with the liquid chemicals; and (c) operating the pump to dispense the liquid chemicals from the tank into the conduit through the second line.

21. A tank system for storing and containing liquid chemicals, the tank system comprising:

(a) a poly tank adapted for storing and discharging the liquid chemicals;

(b) a containment basin having a bottom and an open top and adapted to receive the liquid chemicals if the liquid chemicals leak from the tank; wherein;

i) the tank comprises:

(1) walls;

(2) a bottom;

(3) a lower portion;

(4) an upper portion having an eave defined by the walls of the tank;

(5) an inlet provided in the upper portion of the tank and adapted to allow inflow of the liquid chemicals into the tank; and (6) an outlet provided in the upper portion of the tank and adapted to allow outflow of the liquid chemicals; and ii) the tank is nested in the containment basin such that the lower portion of the tank lies within the basin and the cave in the upper portion of the tank extends horizontally beyond and above top edges of the basin.

22. The tank system of claim 21, wherein both the containment basin and the tank have an octagonal prismatic geometry, a rectangular prismatic geometry, or a cylindrical geometry.

23. The tank system of claim 21, wherein the containment basin and the tank have complimentary geometries such that the tank is closely nested in the containment basin.

24. The tank system of claim 21, wherein the tank comprises a parting line in the upper portion of the tank.

25. The tank system of claim 24, wherein the parting line is provided in the eave.

26. The tank system of claim 24, wherein the tank has a fill line below the parting line.

27. The tank system of claim 21, wherein the tank has a fill line coincident with the open top of the basin.

28. The tank system of claim 21, wherein the basin has a capacity at least as great as an actual capacity of the tank.

29. The tank system of claim 21, wherein the bottom of the poly tank has a flat surface and the bottom of the basin has a flat surface and the flat surface of the bottom of the poly tank is supported on the flat surface of the bottom of the basin.

30. The tank system of claim 21, wherein the top surface of the upper portion of the tank has one or more molded beams or pedestals.

31. The tank system of claim 21, wherein the tank comprises molded pillars extending upwardly from the bottom of the tank.

32. The tank system of claim 21, wherein the inlet comprises an extraction valve mounted in the upper portion of the tank.

33. The tank system of claim 32, wherein the inlet extraction valve is adapted for coupling to a fill nozzle for flowing the liquid chemicals into the tank.

34. The tank system of claim 33, wherein the inlet extraction valve is adapted for vapor-tight coupling to the fill nozzle.

35. The tank system of claim 21, wherein the outlet comprises an extraction valve mounted in the upper portion of the tank.

36. The tank system of claim 35, wherein the outlet extraction valve has a tube extending downward to a point proximate the bottom of the tank and is adapted for coupling to a fluid line.

37. The tank system of claim 34, wherein the outlet comprises an extraction valve mounted in the upper portion of the tank and said extraction valve has a tube extending downward to a point proximate the bottom of the tank and is adapted for coupling to a fluid line.

38. The tank system of claim 21, where the tank comprises a pressure relief valve mounted in the upper portion of the tank.

39. The tank system of claim 21, where the tank comprises a depth gauge.

40. The tank system of claim 21, wherein the containment basin is a poly containment basin and the tank has a nominal capacity of at least about 330 gallons.

41. The tank system of claim 21, wherein the containment basin is a poly containment basin and the tank has a nominal capacity of at least about 550 gallons.

42. A poly tank adapted for storing liquid chemicals, the poly tank comprising:

(a) a lower portion;

(b) an upper portion having an eave defined by walls of the tank and extending above and horizontally beyond the lower portion of the tank;

(c) an inlet provided in the upper portion and adapted to allow inflow of the liquid chemicals into the tank; and (d) an outlet provided in the upper portion of the tank and adapted to allow outflow of the liquid chemicals;

(e) wherein the tank is adapted to nest in a containment basin having an open top such that the lower portion of the tank lies within the containment basin and the eave of the tank covers the open top of the containment basin.

43. The poly tank of claim 42, wherein the tank comprises a parting line in the upper portion of the tank.

44. The poly tank of claim 42, wherein the tank comprises a parting line in the eave of the tank.

45. The poly tank of claim 42, wherein the top surface of the upper portion of the tank has one or more molded beams or pedestals.

46. The poly tank of claim 42, wherein the tank comprises molded pillars extending upwardly from the bottom of the tank.

47. The poly tank of claim 42, wherein the inlet comprises an extraction valve mounted in the upper portion of the tank.

48. The poly tank of claim 47, wherein the inlet extraction valve is adapted for coupling to a fill nozzle for flowing the liquid chemicals into the tank.

49. The poly tank of claim 48, wherein the inlet extraction valve is adapted for vapor-tight coupling to the fill nozzle.

50. The poly tank of claim 42, wherein the outlet comprises an extraction valve mounted in the upper portion of the tank.

51. The poly tank of claim 50, wherein the outlet extraction valve has a tube extending downward to a point proximate the bottom of the tank and is adapted for coupling to a fluid line.

52. The poly tank of claim 49, wherein the outlet comprises an extraction valve mounted in the upper portion of the tank and said extraction valve has a tube extending downward to a point proximate the bottom of the tank and is adapted for coupling to a fluid line.

53. The poly tank of claim 42, where the tank comprises a pressure relief valve mounted in the upper portion of the tank.

54. The poly tank of claim 42, where the tank comprises a depth gauge.

55. The poly tank of claim 42, wherein the tank has a nominal capacity of at least about 330 gallons.

56. The poly tank of claim 42, wherein the tank has a nominal capacity of at least about 550 gallons.

57. A tank system for storing and containing liquid chemicals, the tank system comprising:

(a) a poly tank adapted for storing and discharging the liquid chemicals;

(b) a containment basin having a bottom and an open top and adapted to receive the liquid chemicals if the liquid chemicals leak from the tank; wherein;

i) the tank is nested in the containment basin such that a lower portion of the tank lies within the basin and an upper portion of the tank covers the open top of the basin; and ii) the tank comprises:

(1) a bottom;

(2) an inlet provided in the upper portion of the tank and adapted to allow inflow of the liquid chemicals into the tank;

(3) an outlet provided in the upper portion of the tank and adapted to allow outflow of the liquid chemicals; and (4) a parting line in the upper portion of the tank.

58. The tank system of claim 57, wherein the tank has a fill line below the parting line.

59. A tank system for storing and containing liquid chemicals, the tank system comprising:

(a) a poly tank adapted for storing and discharging the liquid chemicals;

(b) a containment basin having a bottom and an open top and adapted to receive the liquid chemicals if the liquid chemicals leak from the tank; wherein;

i) the tank is nested in the containment basin such that a lower portion of the tank lies within the basin and an upper portion of the tank covers the open top of the basin; and ii) the tank comprises:

(1) a bottom;

(2) an inlet provided in the upper portion of the tank and adapted to allow inflow of the liquid chemicals into the tank;

(3) an outlet provided in the upper portion of the tank and adapted to allow outflow of the liquid chemicals; and (4) one or more molded beams or pedestals in the top surface of the upper portion of the tank.

60. A tank system for storing and containing liquid chemicals, the tank system comprising:

(a) a poly tank adapted for storing and discharging the liquid chemicals;

(b) a containment basin having a bottom and an open top and adapted to receive the liquid chemicals if the liquid chemicals leak from the tank; wherein;

i) the tank is nested in the containment basin such that a lower portion of the tank lies within the basin and an upper portion of the tank covers the open top of the basin; and ii) the tank comprises:

(1) a bottom;

(2) an inlet provided in the upper portion of the tank and adapted to allow inflow of the liquid chemicals into the tank;

(3) an outlet provided in the upper portion of the tank and adapted to allow outflow of the liquid chemicals; and (4) molded pillars extending upwardly from the bottom of the tank.

61. A tank system for storing and containing liquid chemicals, the tank system comprising:

(a) a poly tank adapted for storing and discharging the liquid chemicals;

(b) a containment basin having a bottom and an open top and adapted to receive the liquid chemicals if the liquid chemicals leak from the tank; wherein;

i) the tank is nested in the containment basin such that a lower portion of the tank lies within the basin and an upper portion of the tank covers the open top of the basin; and ii) the tank comprises:

(1) a bottom;

(2) an inlet provided in the upper portion of the tank and adapted to allow inflow of the liquid chemicals into the tank; and (3) an outlet provided in the upper portion of the tank and adapted to allow outflow of the liquid chemicals; and iii) the inlet comprises an extraction valve mounted in the upper portion of the tank.

62. A tank system for storing and containing liquid chemicals, the tank system comprising:

(a) a poly tank adapted for storing and discharging the liquid chemicals;

(b) a containment basin having a bottom and an open top and adapted to receive the liquid chemicals if the liquid chemicals leak from the tank; wherein;

i) the tank is nested in the containment basin such that a lower portion of the tank lies within the basin and an upper portion of the tank covers the open top of the basin; and ii) the tank comprises:

(1) a bottom;

(2) an inlet provided in the upper portion of the tank and adapted to allow inflow of the liquid chemicals into the tank;

(3) an outlet provided in the upper portion of the tank and adapted to allow outflow of the liquid chemicals; and iii) the outlet comprises an extraction valve mounted in the upper portion of the tank.

63. A poly tank adapted for storing liquid chemicals, the poly tank comprising:

(a) a lower portion;

(b) an upper portion providing an eave extending above and horizontally beyond the lower portion of the tank;

(c) an inlet provided in the upper portion and adapted to allow inflow of the liquid chemicals into the tank; and (d) an outlet provided in the upper portion of the tank and adapted to allow outflow of the liquid chemicals;

(e) wherein:

i) the tank is adapted to nest in a containment basin having an open top such that the lower portion of the tank lies within the containment basin and the eave of the tank covers the open top of the containment basin; and ii) a top surface of the upper portion of the tank has one or more molded beams or pedestals.

64. A poly tank adapted for storing liquid chemicals, the poly tank comprising:

(a) a lower portion;

(b) an upper portion providing an eave extending above and horizontally beyond the lower portion of the tank;

(c) an inlet provided in the upper portion and adapted to allow inflow of the liquid chemicals into the tank; and (d) an outlet provided in the upper portion of the tank and adapted to allow outflow of the liquid chemicals;

(e) wherein:

i) the tank is adapted to nest in a containment basin having an open top such that the lower portion of the tank lies within the containment basin and the eave of the tank covers the open top of the containment basin; and ii) the tank comprises molded pillars extending upwardly from a bottom of the tank.

* * * * *